United States Patent [19]

Saburi

[11] 4,107,608

[45] Aug. 15, 1978

[54] METHOD AND APPARATUS FOR BURST SYNCHRONIZATION IN A TIME DIVISION MULTIPLE ACCESS COMMUNICATION SYSTEM

[75] Inventor: Akio Saburi, Tokyo, Japan

[73] Assignee: Nippon Electric Co., Ltd., Tokyo, Japan

[21] Appl. No.: 747,822

[22] Filed: Dec. 6, 1976

[30] Foreign Application Priority Data

Dec. 10, 1975 [JP] Japan .................................. 50-147569

[51] Int. Cl.² .............................................. H04J 3/06
[52] U.S. Cl. ...................................... 325/4; 178/69.1; 179/15 BS
[58] Field of Search ................ 325/4, 1, 6, 2; 179/15 BS; 178/69.1

[56] References Cited

U.S. PATENT DOCUMENTS

| | | | |
|---|---|---|---|
| 3,562,432 | 2/1971 | Gabbard | 325/4 |
| 3,730,998 | 5/1973 | Schmidt et al. | 325/4 |
| 3,772,475 | 11/1973 | Loffreda | 325/4 |
| 3,778,715 | 12/1973 | Schmidt | 325/4 |
| 3,789,142 | 1/1974 | Shimasaki | 179/15 BS |
| 3,813,496 | 5/1974 | Maillet | 325/4 |
| 3,922,496 | 11/1975 | Gabbard | 325/4 |
| 3,982,075 | 9/1976 | Jefferis | 325/4 |
| 4,028,497 | 6/1977 | Saburi | 325/4 |

*Primary Examiner*—Robert L. Griffin
*Assistant Examiner*—Michael A. Masinick
*Attorney, Agent, or Firm*—Ostrolenk, Faber, Gerb & Soffen

[57] ABSTRACT

A burst synchronization technique employed in a multiple access TDMA communication system in which all member stations communicate through a common repeater apparatus such as a stationary satellite.

A member station may gain access by transmitting during its allocated time slot. A time frame is defined as having a time duration equal to at least the time for the burst intervals of all the member stations preferably with at least a small guard time between bursts. A super-frame is defined as containing a plurality of frames which are sufficient in number to provide for a measurement period, a correction period and advance notice period and a propagation period.

Synchronization at a station is attained by receiving a reference signal transmitted by one member station and returned from the repeater to all stations; measuring the magnitude and polarity of the difference of the super frame timing reference relative to that of the station; transmitting said difference in advance of correction and then correcting said station timing relative to the reference during a correction phase.

Other member stations receive the different information only during the advance notice phase and correct only during the correction phase of a super frame, even in the absence of receiving a timing pulse for providing synchronization.

Means are provided for facilitating synchronization between receiving and transmitting facilities at each station over a reduced time period.

4 Claims, 9 Drawing Figures

METHOD AND APPARATUS FOR BURST SYNCHRONIZATION IN A TIME DIVISION MULTIPLE ACCESS COMMUNICATION SYSTEM

BACKGROUND OF THE INVENTION

The present invention relates to a burst synchronization technique in time division multiple access (TDMA) communication system, especially in time division multiple access communication systems making use of stationary communication satellites.

As used herein, the term multiple access communication refers to a method in which a plurality of communication stations communicate with each other through one repeater apparatus. Such systems have been widely employed especially in the field of satellite communication. Prior art multiple access communication systems have been established according to a frequency division system, that is, a system in which frequencies to be used for communication between the respective stations are preliminarily allotted.

Recent developments in digital techniques have permitted the employment of multiple access communication on a time division basis in place of the frequency division basis. Multiple access communication on a time division basis is a method in which time slots are allotted for communication between the respective stations. Such systems are highly flexible because change of the allotment time is easy. However, in order to maintain such communication systems, various kinds of synchronizing functions are necessary. The burst synchronization according to the present invention is also directed to one of said various kinds of synchronization. Furthermore, recent advances in the field of radio communication, have made it desirable to utilize frequency bands higher than 10 GHz (e.g., quasi-millimeter wave band, millimeter wave band, . . . . . ). However, if such frequency bands are utilized for space propagation, there was a fear that they may be subjected to large attenuation caused by rainfall resulting in degradation of a C/N ratio (carrier power to noise power ratio) and thereby collapse of the synchronizing system itself. To avoid this problem, prior art systems improve the C/N ratio by increasing the number of bits in a carrier wave synchronizing signal, a bit timing synchronizing signal and a frame synchronizing signal. However, such an approach necessitates the transmission of surplus signals which are unnecessary for an inherent data transmission. Not only does this lower the transmission efficiency of the system but it limits the extent of improvement thereof.

OBJECTS OF THE INVENTION AND BRIEF DESCRIPTION OF THE FIGURES

One object of the present invention is to provide a method and an apparatus or burst synchronization which can enhance reliability of a communication system and which can increase transmission efficiency in a TDMA communication system having an unstable factor which is varied depending upon the weather as described above.

Now the invention will be described in more detail with reference to the accompanying drawings, in which.

DETAILED DESCRIPTION OF THE PRIOR ART AND THE INVENTION AND PREFERRED EMBODIMENTS THEREOF

Figure 1:
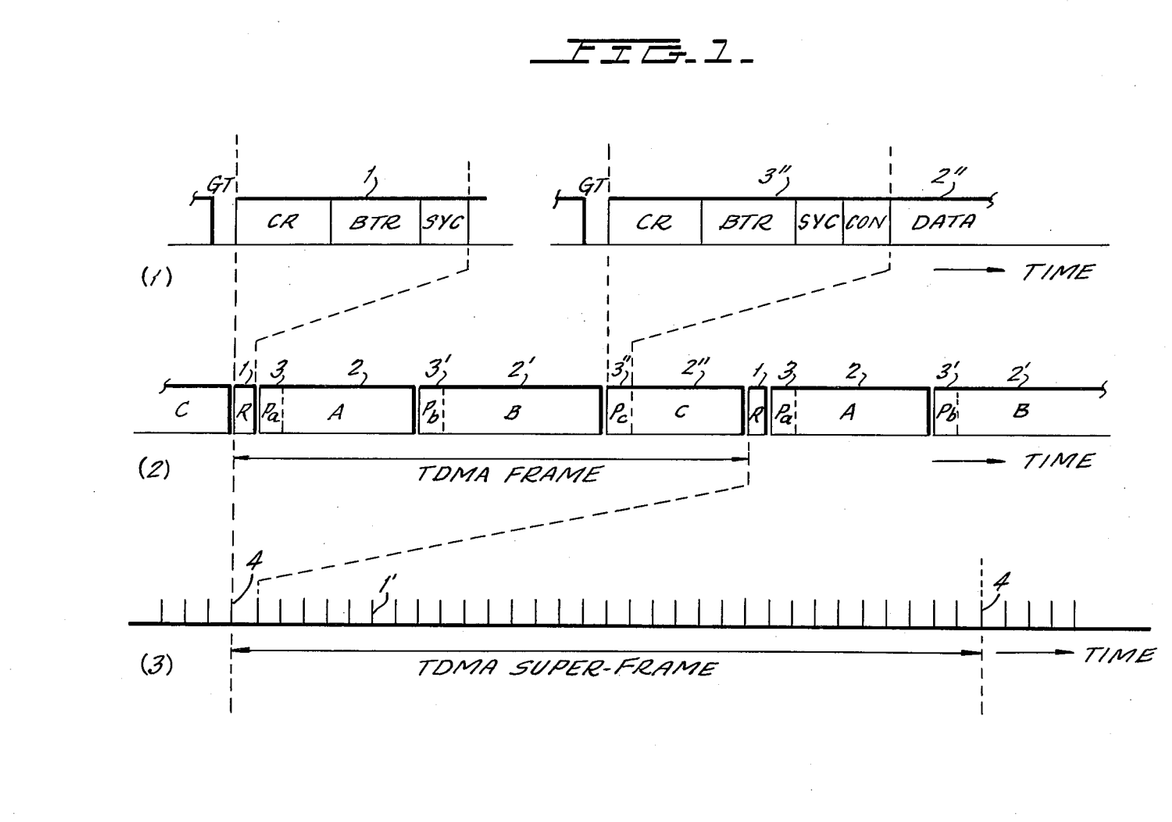
FIG. 1 shows graphical representations of structures in time of signals in TDMA communication.

Referring now to FIG. 1 of the drawings, time slots of exemplary TDMA communication signals are illustrated. Particularly, time is, and an array in time of the signals transmitted from the respective stations upon passing through a repeater is illustrated.

The signals transmitted from the respective stations are intermittent ones as shown in FIG. 1(A), and are called bursts. These bursts successively pass through a repeater while being controlled so as not to overlap in time with each other as shown in FIG. 1(A). The array of the signals has a periodic nature, and one period thereof referred to as a TDMA frame ($T_f$). Each station communicates with the remaining stations by transmitting one burst-like signal TDMA frame.

In the synchronizing system according to the present invention, a TDMA super-frame, serving as an upper constructive unit for the TDMA frames, is defined as shown in FIG. 1(C), and various controls are carried out by employing the timing of this super-frame ($T_{sf}$).

In FIG. 1(B), a burst designated by reference numeral 1 is called a reference burst (R), the details of which are shown in an enlarged scale in FIG. 1(A). The reference burst 1 comprises a carrier wave synchronizing signal CR used for demodulation and a bit timing synchronizing signal BTR, and, as a representative construction, a synchronizing signal SYC serving as a reference for the TDMA frame. Particularly, the preamble signals include, sequentially, a carrier wave synchronizing. Reference burst (R) is transmitted by a reference station selected from a plurality of stations A, B, C . . . that make up the communication system.

Reference numerals 2, 2' and 2" in FIG. 1(B) designate data bursts transmitted from the stations A, B, and C, respectively. In front of the respective data bursts are disposed preamble signals Pa, Pb and Pc designated by numerals 3, 3' and 3", respectively. The preamble signals are similar in construction to reference burst as shown in FIG. 1(A). Particularly, the preamble signals include, sequentially, a carrier wave synchronizing signal CR, a bit timing synchronizing signal BTR, a data burst synchronizing signal SYC, and a control signal CON, and a data portion DATA.

A TDMA communication system is established by being controlled controlling the timing of the synchronizing signals SYC in the preamble signals of the data bursts transmitted from the respective stations in such a manner that they sustain predetermined relative positions with respect to the synchronizing signal SYC in the reference burst (R). As such, the reference burst (R) serves as a reference of a frame and timing is by burst synchronization control. One possible method of defining a TDMA super-frame, see FIG. 1(C), is described below.

In the following discussion, a synchronizing signal SYC in a reference burst is designated as (R-SYC). A) a timing reference signal 1' of a regular frame is identified by transmitting (R-SYC), and a timing reference 4 of a super-frame is identified by transmitting $(\overline{\text{R-SYC}})$, that is, a complementary pattern.

Member stations of the system, other than the reference station, employ the synchronizing signals SYC in the data burst transmitted from their own stations to transmit $(\overline{\text{N-SYC}})$ instead of the normal pattern (N-SYC), and synchronization of super-frames can be established by operations controlled in such manner that the above-referred $(\overline{\text{R-SYC}})$ and the signal $(\overline{\text{N-SYC}})$ of their own stations may appear within the same frame.

Figure 2:
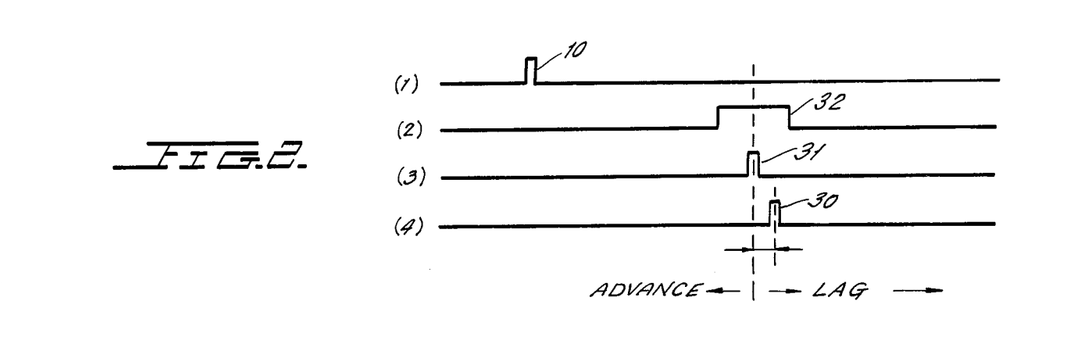
FIG. 2 is a timing chart for transmission burst synchronization.

In FIG. 2, a timing chart for the above-described burst synchronization is shown. FIG. 2(A) illustrates a reception frame pulse 10, which is generated in response to reception of (R-SYC). FIG. 2(b) illustrates a reception forecast gate 32 signal, and FIG. 2(C) illustrates a reception forecast position signal 31. Forecast position signal 31 represents a forecast on the part of the receiving station of the position where the synchronizing signal (L-SYC) within the data burst signal generated by its own station and transmitted to the repeater is to be received. The forecast gate signal takes the form of a gate signal 32 of, for example, 5 ~ 7 bits in width, and it is employed to prevent erroneous detection of (L-SYC). FIG. 2(d) illustrates a stations own synchronizing signal detection pulse 30, which appears in response to detection of (L-SYC). If this detection pulse 30 does not occur within the interval of forecast gate 32, then it is disregarded as erroneous detection. The difference in position between the detection pulse 30 and the forecast position signal 31 is due to a transmission timing error, that is, due to a transmission phase error within a TDMA frame, so that it must be corrected. For that purpose, polarity of the phase difference (advance or lag) and an absolute value of the error (measured at the units of bits) are detected.

Figure 3:
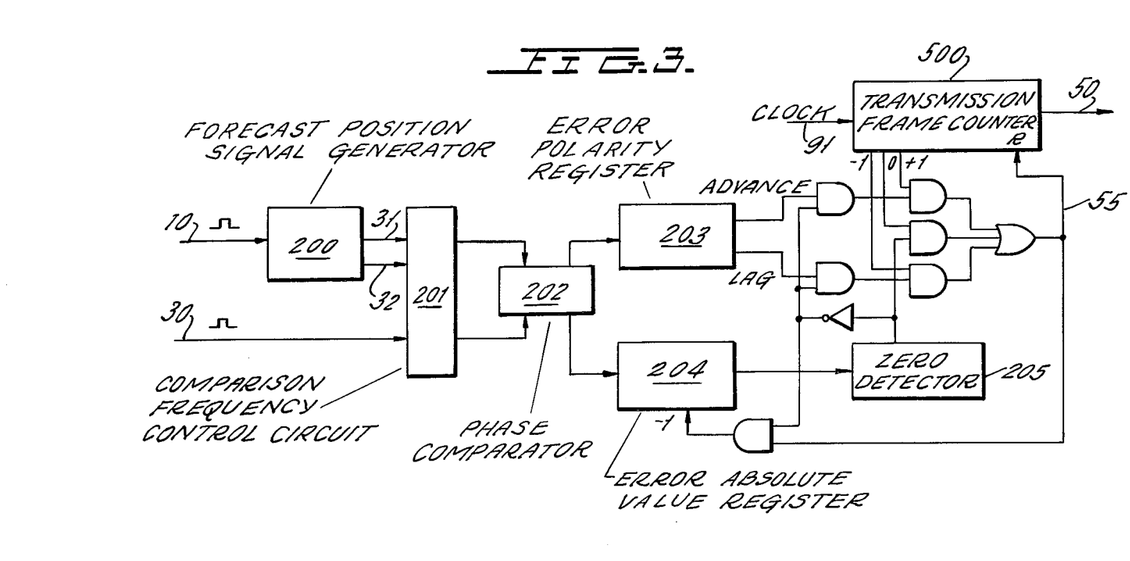
FIG. 3 is a block diagram of a transmission burst synchronizer circuit in the prior art.

FIG. 3, is a block diagram of a prior art transmission burst synchronizing circuit which detects and corrects the above referred phase error. In this circuit, the reception frame pulse 10 is applied to a forecast position signal generator 200 to generate the reception forecast position signal 31 and the reception forecast gate signal 32. On the other hand the station's synchronizing signal detection pulse 30 is passed through a comparison frequency control circuit 201 together with the above-mentioned signals and applied jointly to a phase comparator 202. The polarity of the error and the absolute value of the error are detected by comparator 202 and recorded in registers 203 and 204, respectively.

The comparison frequency control circuit 201 controls the comparison rate, for example once per about 0.3 seconds or less when a stationary satillite is employed as a repeater. Control circuit 201 also prevents a corrected result of a transmission phase from being repeatedly corrected during the period before it is again received via the repeater. Finally, control circuit 201 avoids erroneous comparison when detection of the synchronizing signal cannot be carried out due to a condition of a communication line or when erroneous detection is made.

A transmission phase (or transmission timing) of a signal is controlled by a transmission frame counter 500 that is driven by a transmission clock signal 91. By decoding the content of this counter various transmission timing signals 50 can be obtained.

Assuming that the number of symbols in one TDMA frame is N, a decoder adapted to detect when the content of the transmission frame counter has become N, is included as part of the counter, so that the transmission frame counter 500 functions as an N-ary self-running counter by generating a reset signal 55 with the decoder to reset the contents of the counter to zero. Furthermore, for the purpose of carrying out transmission burst synchronization, in addition to the decoder of N (that is a decoder which generates a reset signal when the count in counter 500 is N + O), decoders of N + 1 (corresponding to a count in counter 500 of N + 1) and of N − 1 (corresponding to a count in counter 500 of N − 1) are contained in the counter, and the correction can be made by employing the output of the decoder of N + 1 as the reset signal 55 for the number of frames corresponding to the absolute value of the error casses when the transmission phase is advanced, or by employing the output of the decoder of N − 1 in case that the transmission phase is lagged.

The above-mentioned circuit can be realized with a logic circuit as shown in FIG. 3. As shown therein, the content of the error absolute value register 204 is monitored by a zero detector 205, content of register 204 is other than zero, the N + 1 output of the decoder as the reset signal 55 depending upon the content (representing advancing or lagging phase) of the error polarity register 203. In addition to resetting counter 500, the reset signal 55 decreases the content of the error absolute value register 24 by one. When the zero detector 205 indicates that the content of the register 204 is zero (as a result of such processes), the correction operation is stopped, and the transmission frame counter 500 is reset by the N + O output of the decoder and thus returns to an N-ary counter. With regard to further details of the transmission burst synchronizer circuit in the prior art (FIG. 3), reference should be made to U.S. Pat. No. 3,562,432 issued Feb. 9, 1971.

Returning now to FIG. 1, in the general TDMA communication system, the carrier wave and the bit timing (clock) of the burst transmitted from each station are independent of and asynchronous to each other. Accordingly, it is necessary to add signals such as CR, BTR, etc. to the initial part of each burst as shown in FIG. 1(A), and upon reception demodulation, to synchronize a receiver with respect to a carrier wave phase and a bit timing phase for each burst, and then carry out demodulation of the subsequent data part (called burst operation). In addition, in order to carry out demodulation of the data part, burst synchronization is necessary for reception. More particularly, only establishment of word synchronization of the subsequent data by detecting the synchronizing signal SYC from the reception data burst, will result in correct demodulation of the data. Stated otherwise, if even one of the synchronizations should fail to be established, the data of that burst can not be demodulated. Furthermore, if the detection of the synchronizing signals SYC should fail over a number of frames, then the maintenance per se of the TDMA communication system would become impossible.

As mentioned previously, in the communication of a quasi-millimeter wave band or a millimeter wave band, sometimes the communication is subjected to large attenuation due to rainfall, in this case the reception C/N ratio (carrier wave power to noise power ratio) is extremely degraded, and if the method of synchronization for TDMA in the prior art is employed in such a communication line, it is possible that the entire communication system may fail.

One method for preventing the failure of the communication system even if the C/N ratio is degraded, is to prolong the periods such as CR, BTR, SYC, etc. shown at (1) in FIG. 1.

By prolonging CR and BTR it becomes possible to enhance Q-values of the tuning circuits in the carrier wave synchronizer circuit and in the bit timing synchronizer circuit, and thereby the C/N ratio can be equivalently improved. In addition, by prolonging the length of the pattern of SYC to perform correlation detection between patterns which are allowed to have many errors, the probability of misdetection of the pattern of SYC can be reduced even under a low C/N condition. However, this method lowers the transmission efficiency of the system. Additionally, the extent of improvement obtainable with this method is limited, because various synchronizing signals which are in themselves unnecessary for data transmission must be transmitted to an excessive amount.

The present invention provides means for enhancing reliability of a communication system and preventing transmission efficiency from lowering or rather improving transmission efficiency by maintaining synchronization of the communication system even under the above-mentioned low C/N condition.

Various systems for enhancing a transmission efficiency by shortening the carrier wave synchronizing signal CR, bit timing synchronizing signal BTR and frame or burst synchronizing signal SYC as shown in FIG. 1(A), have been proposed. For instance, in a transmission employing a PSK modulation system, it is possible to shorten the carrier wave synchronizing signal CR up to the width of one symbol by employing delayed detection. Further, it is known that the bit timing synchronizing signal BTR can be commonly used for the frame or burst synchronizing signal SYC by employing a sample-hold synchronizing technique, and also the signal SYC itself can be shortened. The sample-hold synchronizing technique is a method in which bit timing synchronizing circuits are provided on the receiver side, said circuits being equal in number to the number of stations from which signals are to be received including its own station, and in which continuous bit timing synchronizing signals are prepared for the respective received signals by making use of a phase synchronizing technique. For examples of such prior art sample-hold synchronizer circuits, reference should be made to an article by M. Tachibana entitled "CONSIDERATIONS ON THE CLOCK SYNCHRONIZATION LOOP INCLUDING DELAY TIME" appearing in INTELSAT/IEE International Conference on Digital Satellite Communication, Nov. 25–27 1969, p.p. 116–126.

Considering an operation under a low C/N condition to which the present invention is directed, it will be seen that the above-referred to sample-hold synchronizing technique has a great advantage.

In order to establish bit timing synchronization in a burst operation, a synchronizer circuit having a Q-value corresponding to the length of the bit timing synchronizing signal BTR must be used. In contrast, synchronization may be established during several to several tens of frames in the case of the sample-hold synchronization. As a result, it becomes possible to narrow the band width of the commonly used phase synchronizer circuit to any desired extent, resulting in a remarkable improvement in the C/N ratio. In summary, in a TDMA communication system using the sample-hold synchronizing technique, it is possible to maintain the reception bit timing even if the C/N ratio of the communication line should be largely degraded simply by appropriately selecting design parameters.

If there exists means for maintaining transmission burst synchronization even when the C/N ratio is largely degraded, it becomes possible to maintain a TDMA communication system, and thus it is seen that this is greatly effective for utilization of quasi-millimeter and millimeter wave bands. Of course, the data to be transmitted may itself be greatly degraded in quality by the degradation of the C/N ratio, but so long as the communication system is maintained, the restoration of the quality can be achieved quickly and there remains a way for improving the quality by employing an error correction technique.

As described above, an object of the present invention is to maintain burst synchronization regardless of the value of the C/N ratio. To to achieve this object, the present invention utilizes super-frame timing whose synchronization is established on a repeater. An advance notice period and a correction time point are defined on the super-frame and, a station which intends to correct a transmission phase for transmission burst synchronization provides a preliminarily indication of the polarity and magnitude of the phase to be corrected to the relevant stations via a control line (for example, a control signal CON in FIG. 1(A) is used). This information is transmitted in the advance notice period, and the respective stations receive this advance notice signal at a high reliability by employing the method of determination according to decision by majority or the like and simultaneously correct the phase in the reception burst synchronizer circuits at the next correction time point.

It becomes possible to positively receive and demodulate each burst regardless of whether or not a synchronous signal is detected during each burst. As a result, synchronization can be sustained and the communication system itself can be maintained even upon great degradation of the C/N ratio. The present invention is described in detail below with reference to the accompanying drawings.

Figure 4:
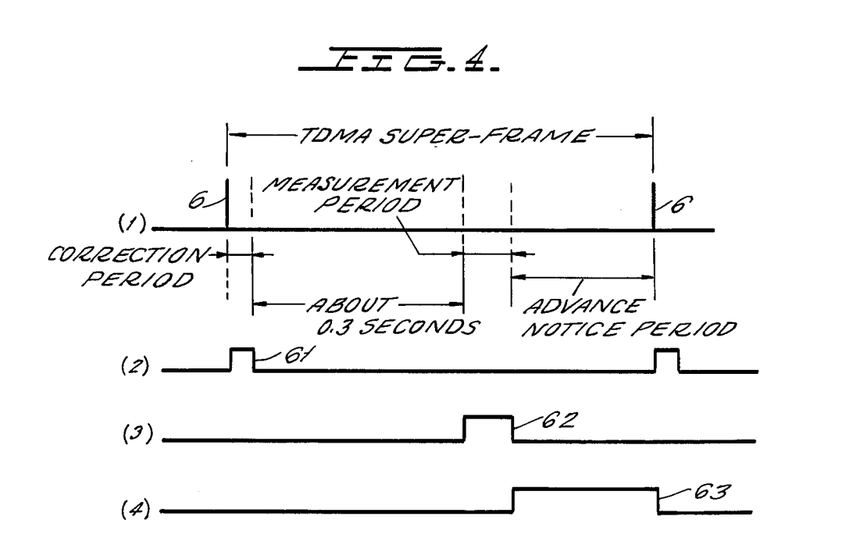
FIG. 4 is a timing chart for various gate signals in a TDMA super-frame in the case of employing the method for synchronization according to the present invention.

FIG. 4 is a time chart representing various timing relationships in a TDMA super-frame employing the method of synchronization according to the present invention. In TDMA communication, system, the signals transmitted from the respective stations are combined only at the repeater. As a result, the TDMA frame and thus the TDMA super-frame must be defined at repeater.

Since all the signals passed through the repeater are received in the same array, the timing of the TDMA super-frame on the repeater appears on the receiver side after a certain propagation delay. Similarly, one can consider on the transmitter side imaginary TDMA super-frame timing which will impose correct timing on the repeater. The TDMA super-frame timing 4 illustrated in FIG. 1(C) represents the timing as viewed on the repeater or on the receiver side. The TDMA super-frame timing 6 illustrated in FIG. 4(A) represents the timing viewed on the transmitter side. As shown in FIG. 4(A) the TDMA super-frame is provided with a correction period, a measurement period and a advance notice period. Signals corresponding to the respective periods, (a correction eriod gate signal 61, a measurement period gate signals 62 and an advance notice period gate signal 63) are generated as shown in FIGS. 4(B)–4(D). Between the correction period and the measurement period it is necessary to retain an interval larger than propagation delay time ($T_x$) that is required for the forward and backward propagation between the station and the repeater. In cases where a stationary satellite is used as a repeater, an interval of about 0.3 seconds is necessary.

It is appropriate to reserve one to several frames for the correction period, although this number will vary with the particular communication system; ten to several tens of TDMA frames for the measurement period; and $2^5 \sim 2^{10}$ TDMA frames (about 0.1 seconds) for the advance notice period. Accordingly, the length of the TDMA super-frame in the case of employing a stationary satellite is considered to be about 0.4 to 0.5 seconds.

Figure 5:
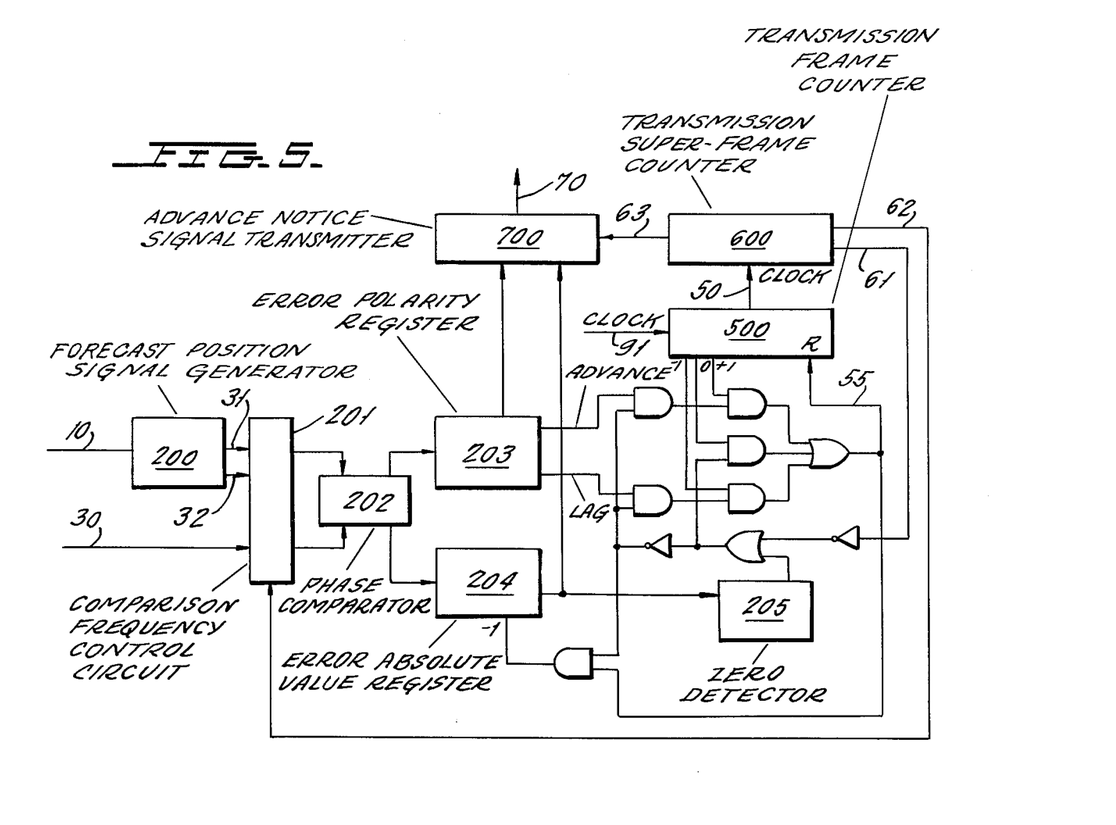
FIG. 5 shows one preferred embodiment of a transmission burst synchronizer circuit according to the present invention.

FIG. 5 shows one preferred embodiment of the transmission burst synchronizer circuit according to the present invention, in which blocks or signals designated by like reference numerals as those in FIG. 3 have like functions. There is provided a transmission super-frame counter 600 driven by a timing signal 50 emitted from a transmission frame counter 500. Counter 600 generates the gate signals 61, 62 and 63 as shown in FIG. 4. The phase correction for the transmission frame counter as described previously in connection with FIG. 3 is permitted only within the period when the correction period gate signal 61 exists, and a comparison frequency control circuit 201 operates so as to permit comparison only once during the period when the measurement period gate signal 62 exists, as will be seen from FIG. 5. The measured polarity and absolute value of the error are transmitted to all the member stations as an advance notice signal 70 by an advance notice signal transmitter 700 within the period when the advance notice period gate signal 63 exists.

It is to be noted that the advance notice signal transmitter 700 is provided for the purpose of inserting measured data into the portion CON as represented in FIG. 1(A), and this corresponds to a transmitter section of a control line instrument normally used in a TDMA communication system.

Figure 6:
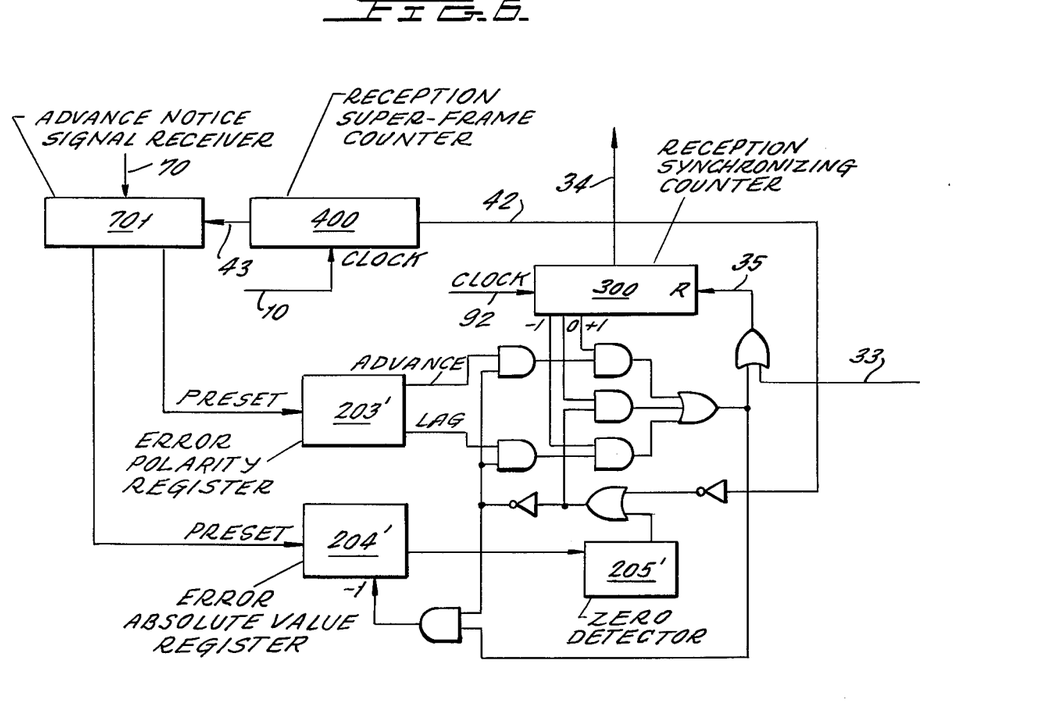
FIG. 6 shows one preferred embodiment of a reception burst synchronizer circuit according to the present invention.

FIG. 6 shows one preferred embodiment of the reception burst synchronizer circuit according to the present invention, in which blocks or signals designated by the same reference numerals as those in FIG. 3 have like functions. However, it is to be noted that blocks 203' to 205' are provided separately from the blocks 203 to 205 in FIG. 5. The reception burst synchronizer circuit illustrated in this figure is an original one that is inherent to the present invention and that cannot be found in the heretofore known TDMA communication apparatuses, in which, even in case where a synchronizing signal detection pulse 33 of its party station or its own station cannot be detected, reception burst synchronization is maintained by generating a dummy detection pulse 34 to be substituted therefor.

A reception super-frame counter 400, driven by reception frame pulses 10, generates reception super-frame timing signals 42 and 43 corresponding to the transmitter side super-frame timing signals as shown in FIG. 4. The signal 42 is a correction period gate signal corresponding to the signal 61 in FIG. 4, and the signal 43 is an advance notice period gate signal corresponding to the signal 63. An advance notice signal receiver circuit 701 is provided for the purpose of receiving an advance notice signal 70 transmitted from a transmitting station in the CON portion of a burst as shown in FIG. 1, and this circuit corresponds to a receiver section in a normal control line instrument. In response to the received advance notice signal, the polarity and magnitude of the error to be corrected are recorded in the registers 203' and 204', respectively. A reception synchronizing counter 300 corresponding to the transmission frame counter 500 in FIG. 3, is driven by a continuous clock signal 92 that is extracted from the signal of the party station (In some cases the station may be its own station.) to which this reception synchronizer circuit is correlated, by using the sample-hold synchronizing technique and the like. Phase correction of the reception synchronizing counter 300 is permitted only during the period when the correction period gate signal 42 exists.

If a gate signal similar to the reception forecast gate signal 32 illustrated in FIG. 2 is used in combination with said dummy detection pulse 34, then the reception synchronizing counter 300 need not be an N-ary counter where N corresponds to the frame length, but it could be an M-ary counter, provided that $N = M \cdot L$ ($M < L$; M and L being positive integers) and M is equal to or larger than the number of bits representing the width of said reception forecast gate signal 32. Accordingly, the decoder for generating a reset signal 35 would decode $M+1$, $M+0$ and $M-1$. When an M-ary counter is employed, in order to generate L dummy detection pulses 34 within one TDMA frame, it is necessary to select dummy pulses for the correct party station synchronizing signal detection pulses by employing said reception forecast gate signal. In FIG. 6, the number of reception synchronizing counters 300 required are at least as many as the number of party stations.

Figure 7:
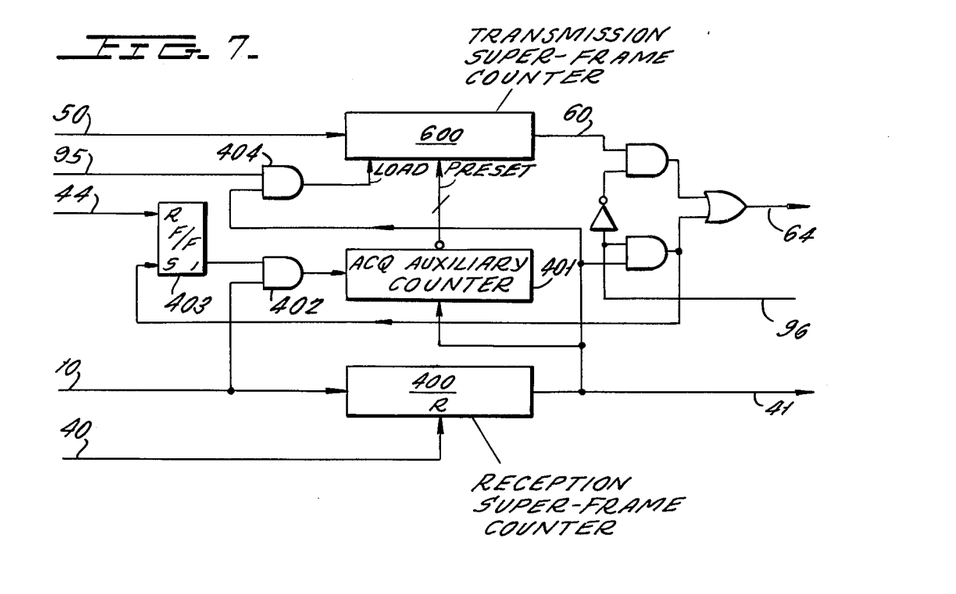
FIG. 7 shows one example of a means for establishing synchronization for a TDMA super-frame utilized according to the present invention.

FIG. 7 shows one example of the circuit for establishing synchronization between the receiver side and the transmitter side with respect to the TDMA super-frame timing which is utilized according to the present invention. It is to be noted that though the transmission super-frame counter 600 and the reception super-frame counter 400 in FIG. 7 differ in the number of input and output lines from those illustrated in FIGS. 5 and 6, respectively, this is because unnecessary input or output lines have been omitted for simplicity of the drawings and for convenience of explanation. With regard to details of the counters 600 and 400, reference should be made to FIGS. 8 and 9, respectively, which will be described later.

In FIG. 7, the reception super-frame counter 400 is a self-running binary counter driven by reception frame pulses 10, and it is reset to its initial state by a reception pulse 40 of the reference station super-frame reference timing as represented by 4 in FIG. 1(C). Since the receiver side super-frame reference timing signal 41 at its output decodes the same content as said initial state and delivers as an output, it can be delivered at its output correctly as a receiver side timing signal even if a reception pulse 40 should be missing.

The transmission super-frame counter 600 is a self-running binary counter driven by transmission frame pulses 50, and it generates a transmitter side super-frame reference timing signal 60.

The synchronization between this reception super-frame counter 400 and the transmitter side super-frame counter 600 is accomplished in the following manner with the aid of a control signal 95, a control signal 96 and an ACQ (Acquisition) auxiliary counter 401. Here it is to be noted that the control signal 95 and the control signal 96 are such signals that while they are maintained at "1" when the transmitter side super-frame timing is out of synchronization, they are switched to "0" midway in the process for establishing synchronization as explained hereunder, but if they fail to result in the establishment of synchronization, then they will return again to "1".

The ACQ auxiliary counter 401 is a binary counter having the same number of digits as the reception and transmission super-frame counters and a period larger than the delay time required for the travelling to and from the repeater. Counter 401 is driven by reception flame pulses 10 via an AND gate 402 and is reset by a receiver side superframe reference timing signal 41. Receiver side super-frame reference timing signal 41 can also be used as a transmitter side super-frame reference timing signal 64 in place of a transmission super-frame counter output 60 under the control of the control signal 96, and in response to this signal, the pattern (L-SYC) of the synchronizing signal SYC within the transmission burst of its own station is changed, for example, to ($\overline{\text{L-SYC}}$). It is to be noted that at this stage the control signal 96 is turned to "0", so that the transmission of ($\overline{\text{L-SYC}}$) caused by the receiver side super-frame reference timing is limited to only once.

The receiver side super-frame reference timing signal from line 41 which has generated ($\overline{\text{L-SYC}}$), simultaneously sets a flip-flop 403 to open AND gate 402. On the other hand, the transmitted ($\overline{\text{L-SYC}}$) is passed through the repeater, is received and detected after a certain delay time, and appears as an own station super-frame reference timing reception pulse 44. This signal resets the flip-flop 403, resulting in the closure of the AND gate 402. Accordingly, the content of the ACQ auxiliary counter 401 may be considered to be a memory of information corresponding to the delay time caused by the transmission to and from the repeater as counted taking the period of the reception frame pulses 10 for a unit. A complementary signal for this information, that is, the information of the difference between the super-frame period and the period of transmission to and from the repeater, is transferred to the transmitter side super-frame counter 600 in response to application of the next receiver side super-frame reference timing signal 41 to a parallel load terminal of the transmitter side super-frame counter 600 via an AND gate 404. It is to be noted that at the stage that the parallel load signal has been applied once, the control signal 95 is turned to "0".

As a result, the transmitter side super-frame counter 600 would be forcibly preset at the state where the timing has been advanced just by the period for transmission to and from the satellite at the position of the receiver side super-frame reference timing.

In the case where the three counters 400, 401 and 600 are binary counters having the same number of digits, once synchronization should be established through the above-mentioned method, then the detection signal 44 of the pattern ($\overline{\text{L-SYC}}$) transmitted thereafter by the transmitter side super-frame reference timing 60 and thus 64 would appear within the same TDMA frame as the reference station super-frame reference timing reception pulse 40, and thereby it is demonstrated that synchronization of the TDMA super-frames has been established. Even when the number of digits of the ACQ auxiliary counter 401 is different from these of the other counters 400 and 600, it is possible to establish synchronization through a similar method.

Figure 8:
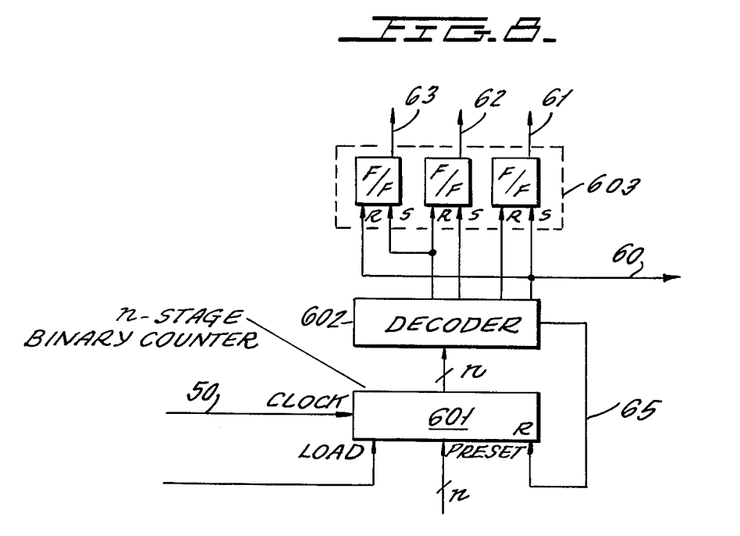
FIG. 8 shows one example of a transmission super-frame counter employed according to the present invention.

FIG. 8 shows one example of a transmission super-frame counter to be used according to the present invention. Reference numeral 601 designates an n-stage binary counter, the value of n being determined from the relation of $2^n > N > 2^{n-1}$. This counter is driven by the transmission frame pulses 50 serving as a clock signal, and the contents in the respective stages of this counter are fed to a decoder 602, where necessary timing pulses such as, for example, the transmitter side super-frame reference timing 60 or the like are generated. The timing pulses are also delivered from the decoder 602 are fed to a gate signal generator circuit 603 consisting of flip-flops to generate various gate signals 61, 62 and 63. In addition, when the decoder 602 detects the value N, it generates a reset pulse 65 which resets the n-stage binary counter 601 to its initial state.

Figure 9:
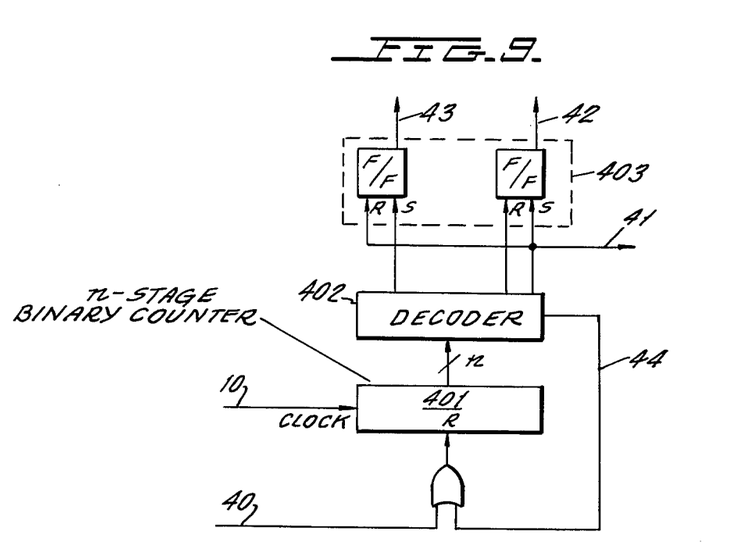
FIG. 9 shows one example of a reception super-frame counter employed according to the present invention.

FIG. 9 shows one example of a reception super-frame counter to be used according to the present invention. This counter is similar to the transmission super-frame counter as described above, and is composed of an n-stage binary counter 401, a decoder 402, a gate signal generator circuit 403, etc. Since the n-stage binary counter 401 is reset to its initial state by a reset pulse 44 which is an N-valued detection pulse in the decoder 402, this counter would operate as a self-running counter of value N.

As described above, according to the present invention, even in cases where the C/N ratio of the communication line has been degraded, the same effect as that occurring when the burst of synchronizing signals transmitted from the respective stations have been reliably received, can be achieved, and thereby the burst synchronization can be maintained, so that the present invention can bring about a large effect upon extension of the applicable fields of the TDMA communication system. In addition, it is a matter of course that this synchronizing method is not limited to satellite communication only, but also it is applicable to the case where a repeater is installed on the ground.

What is claimed is:

1. A synchronizer associated with one of a plurality of member stations in a time division multiple access communication system of the type including said plurality of member stations and a repeater, said repeater sequentially receiving signal bursts from each of said member stations and retransmitting said signal bursts to all of said member stations whereby each of said member stations communicates with the remaining said member stations by transmitting signal bursts to and receiving signal bursts from said repeater, one of said member stations generating a reference signal for identifying a reference time slot in a super-frame comprising a plurality of time slots, each of said member stations being assigned a different one of said time slots, said one of a plurality of member stations also including means for transmitting a frame position synchronizing signal to said repeater, said synchronizer circuit comprising:

means responsive to reception of said reference signal from said repeater and for generating both a reference forecast gate signal and a reference forecast position pulse in response to said reference signal, said reference forecast position pulse being representative of a predicted position of the time slot to which said one of said member stations is assigned, said reference forecast position pulse occurring within the time period when said reference forecast gate signal is present;

means responsive to receipt of said frame position synchronizing signal from the repeater for generating a detection pulse representing the actual position occupied by the station's burst signals;

measurement initiation means responsive to the generation of said detection pulse during the interval of said reference forecast gate signal for comparing said position pulse and said detection pulse and for generating polarity and magnitude signals, respectively, representative of the magnitude and polarity of the position of said detection pulse relative to the position of said forecast position pulse;

means responsive to said polarity and magnitude signals for controlling the instant at which said one of said member stations generates a signal burst containing both said frame position synchronizing signal and data information;

means responsive to predetermined counts of said frame pulses for generating correction gate signals, measurement gate signals and advance notice signals each being of respectively different duration, and all occurring once within a super-frame interval whose duration is at least equal to twice the propagation time between a member station and the common repeater.

2. The system of claim 1 further comprising the means responsive to a transmitted advance notice signal received from said repeater and reponsive to an advanced notice gate signal for recording the polarity and magnitude information forming part of the received advanced notice signal transmission.

3. The system of claim 1 wherein said measurement initiation means further comprises means for initiating a measurement operation only during the occurrence of said measurement gate signal;

means responsive to the initiation of an advance notice signal immediately following said measurement gate signal for transmitting the polarity and magnitude signals used to obtain synchronization at the member station to the repeater.

4. The system of claim 3 wherein said adjusting means further includes means responsive to a correction period signal immediately following an advance notice signal for enabling a correction operation to accomplish phase synchronism.

* * * * *